US007610679B2

(12) United States Patent
Ito

(10) Patent No.: US 7,610,679 B2
(45) Date of Patent: Nov. 3, 2009

(54) METHOD OF PRODUCING INKJET PRINTHEAD

(75) Inventor: Atsushi Ito, Nagoya (JP)

(73) Assignee: Brother Kogyo Kabushiki Kaisha, Nagoya-Shi (JP)

( * ) Notice: Subject to any disclaimer, the term of this patent is extended or adjusted under 35 U.S.C. 154(b) by 342 days.

(21) Appl. No.: 11/271,581

(22) Filed: Nov. 10, 2005

(65) Prior Publication Data

US 2006/0098057 A1 May 11, 2006

(30) Foreign Application Priority Data

Nov. 11, 2004 (JP) ............................ 2004-327214

(51) Int. Cl.
*B23P 17/00* (2006.01)
*B41J 2/045* (2006.01)

(52) U.S. Cl. ....................... 29/890.1; 29/25.42; 29/830; 29/831; 29/832; 29/835; 347/71

(58) Field of Classification Search ................ 29/890.1, 29/25.42, 830, 832, 831, 841, 412, 417, 835; 347/68–71, 72, 48; 216/27; 310/328, 331, 310/312, 311
See application file for complete search history.

(56) References Cited

U.S. PATENT DOCUMENTS 3,207,148 A * 9/1965 Marinace .................. 126/19 R
4,477,103 A * 10/1984 Bertolazzi .................... 283/62
5,128,694 A * 7/1992 Kanayama ................... 347/72
5,402,159 A * 3/1995 Takahashi et al. .............. 347/9
5,909,228 A * 6/1999 Takahashi .................... 347/10
6,459,471 B2 * 10/2002 Robinson et al. .............. 355/40
6,467,885 B2 * 10/2002 Tanaka et al. ................. 347/68

FOREIGN PATENT DOCUMENTS

JP 4-341853 11/1992
JP 2002-105410 4/2002
JP 2002-355965 * 10/2002

* cited by examiner

*Primary Examiner*—Derris H Banks
*Assistant Examiner*—Tai Nguyen
(74) *Attorney, Agent, or Firm*—Reed Smith LLP

(57) ABSTRACT

There is disclosed a method of producing an inkjet printhead including a cavity unit having therein ink passages and formed by stacking a plurality of kinds of flat plates each of which has a specific ink-passage pattern for constituting the ink passages. The method comprises: preparing a large-sized material sheet for each kind of a plate, such that the material sheet comprises a plurality of plate regions, each of which corresponds to one individual plate of the kind, and which are contiguous to one another such that a reserved region for cutting is between each adjacent two plate regions and there is left no margin at a periphery of the material sheet; obtaining a laminate of the material sheets by stacking the material sheets of respective kinds of plates, with the corresponding plates in the respective material sheets aligned in a direction of stacking of the material sheets; and obtaining a plurality of individual laminates by cutting the laminate of the material sheets at the reserved region into the individual laminates.

13 Claims, 9 Drawing Sheets

FIG.6(a)
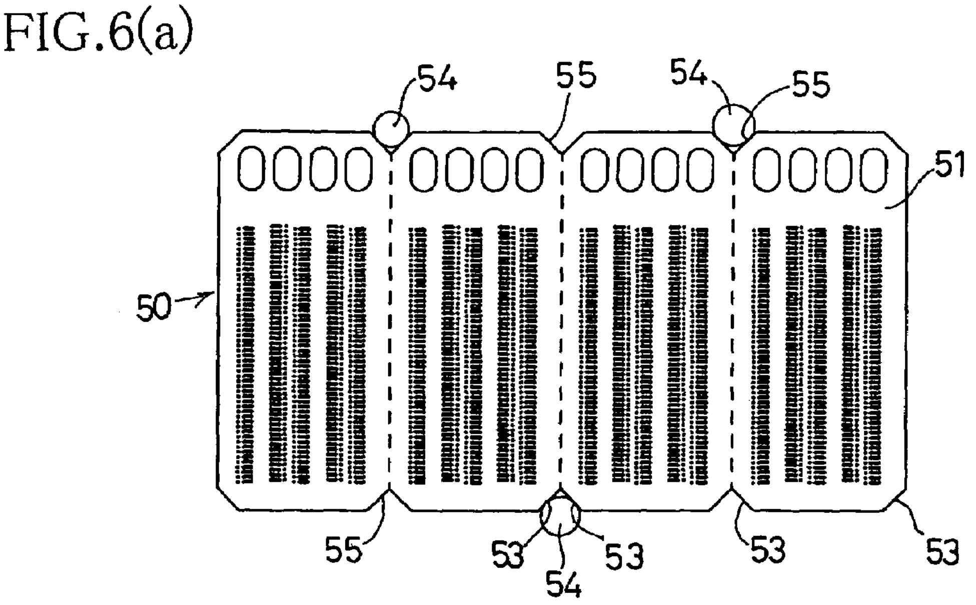
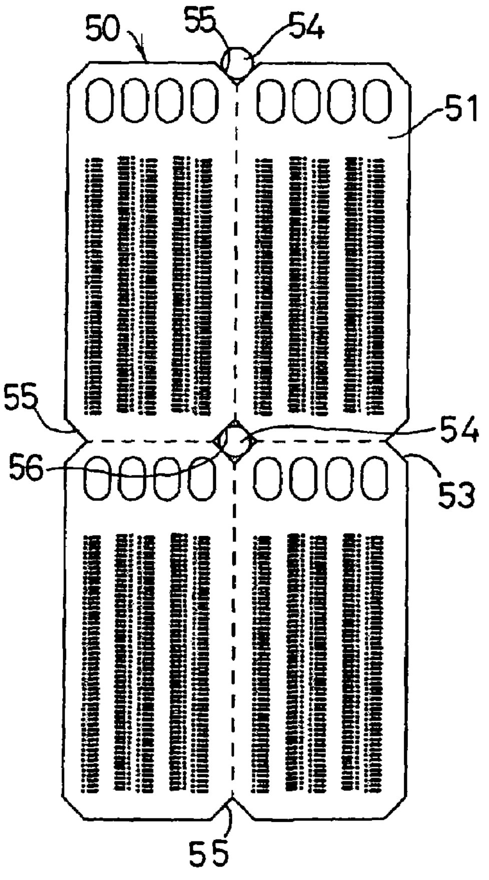
FIG.6(b)
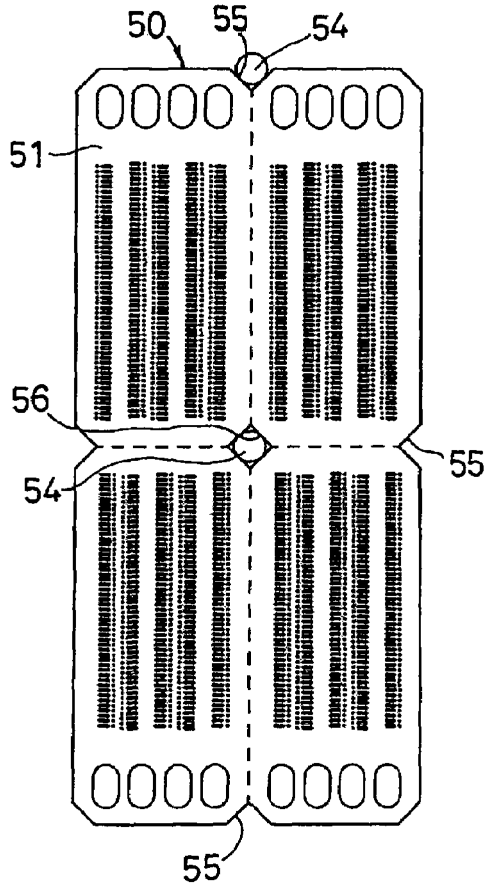
FIG.6(c)

METHOD OF PRODUCING INKJET PRINTHEAD

INCORPORATION BY REFERENCE

The present application is based on Japanese Patent Application No. 2004-327214, filed on Nov. 11, 2004, the content of which is incorporated herein by reference.

BACKGROUND OF THE INVENTION

1. Field of the Invention

The invention relates to a method of producing an inkjet printhead applicable to an image recording apparatus that records information on a recording medium by ejecting ink droplets from nozzles.

2. Description of Related Art

As disclosed in JP-A-2002-105410 (especially FIG. 10) by the present applicant, for instance, there is known a method of producing an inkjet printhead including a cavity unit, a piezoelectric actuator, and a flexible flat cable. The cavity unit has in a front surface thereof a plurality of nozzles arranged in rows, and ink passages for supplying ink as drawn from an ink supply source to the nozzles. The piezoelectric actuator has active portions so as to selectively eject an ink droplet from each nozzle. The flexible flat cable is for supplying electric power to the piezoelectric actuator.

The cavity unit is constructed such that a plurality of flat plates each having an ink-passage pattern are stacked. The ink-passage pattern is for constituting the ink passages, and is mainly constituted by through-holes, but the ink-passage pattern in some of the plates may include recesses also. That is, in the cavity unit, the ink passages are constituted by the ink-passage patterns formed in the plates as stacked. The plates are of various kinds, including a nozzle plate through which the nozzles are formed, a cavity plate in which pressure chambers respectively corresponding to the nozzles are formed in the form of through-holes, and a manifold plate in which common ink chambers for accommodating ink to be distributed to the pressure chambers are formed.

In the production method, a large-sized material sheet is prepared for each kind of a plate constituting the cavity unit. The material sheet includes a predetermined number or a plurality of plate regions that respectively have ink-passage patterns of a same sort for constituting ink passages, a frame encircling the plate regions, and narrow bridges each connecting one of the plate regions and the frame, and all of the plate regions, the frame, and the bridges are integrally formed. The frame has positioning holes formed therethrough in which positioning pins are fitted respectively. A plurality of kinds of material sheets are stacked along the positioning pins that serve as a guide, so as to obtain a laminate of the material sheets. Then, the laminate of the material sheets is segmented by severing all the bridges, into a plurality of individual, discrete laminates of plates.

In the conventional method, however, the frame left after the singulation of the laminate of the material sheets into the individual laminates is useless and discarded, involving some cost.

Further, due to the presence of the frame in the material sheet around the predetermined number of the plate regions, planar dimensions of the material sheet undesirably increase.

SUMMARY OF THE INVENTION

This invention has been developed in view of the above-described situations, and therefore it is an object of the invention to provide a method of producing an inkjet printhead including a cavity unit having a plurality kinds of plates, according to which method a material sheet from which a plurality of plates of a same kind is obtained is configured to be effectively utilizable and produce less waste material, thereby reducing the components cost.

To attain the above object, the present invention provides a method of producing an inkjet printhead including a cavity unit having therein ink passages and formed by stacking a plurality of kinds of flat plates each of which has a specific ink-passage pattern for constituting the ink passages, the method comprising: preparing a large-sized material sheet for each kind of a plate, such that the material sheet comprises a plurality of plate regions, each of which corresponds to one individual plate of the kind, and which are contiguous to one another such that a reserved region for cutting is between each adjacent two plate regions and there is left no margin at a periphery of the material sheet; obtaining a laminate of the material sheets by stacking the material sheets of respective kinds of plates, with the corresponding plates in the respective material sheets aligned in a direction of stacking of the material sheets; and obtaining a plurality of individual laminates by cutting the laminate of the material sheets at the reserved region into the individual laminates.

According to this method, the plate regions are contiguous to one another, with the reserved region for cutting present between each two adjacent plate regions, and without a margin at the periphery of the material sheet. Hence, when cutting or segmenting the material sheet along the reserved region or regions into a plurality of individual, discrete laminates of plates, no waste material is produced from the material sheet. Thus, the method of the invention succeeds in reducing waste of material.

Since there is no margin around the plate regions or at the periphery of the material sheet, planar dimensions of a single material sheet having a predetermined number of the plate regions can be advantageously reduced.

Accordingly, the components cost can be greatly reduced.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIGS. 6(*a*)-6(*c*) show various types of material sheets with positioning pins;

FIG. 7(*b*) is a cross-sectional view taken along line 7(*b*)-7(*b*) in FIG. 7(*a*);

FIG. 7(*c*) is a cross-sectional view taken along line 7(*a*)(*c*)(*e*)-7(*a*)(*c*)(*e*) in FIG. 5, and showing a second example of the weakened portion; and FIG. 7(*d*) is a cross-sectional view taken along line 7(*d*)-7(*d*) in FIG. 7(*c*);

FIG. 7(*e*) is a cross-sectional view taken along line 7(*a*)(*c*)(*e*)-7(*a*)(*c*)(*e*) in FIG. 5, and showing a third example of the weakened portion; and FIG. 7(*i*) is a cross-sectional view taken along line 7(*f*)-7(*f*) in FIG. 7(*e*);

DETAILED DESCRIPTION OF PREFERRED EMBODIMENTS

Hereinafter, there will be described an inkjet printhead produced by a method according to one embodiment of the invention, by referring to FIGS. 1-8.

Figure 1:
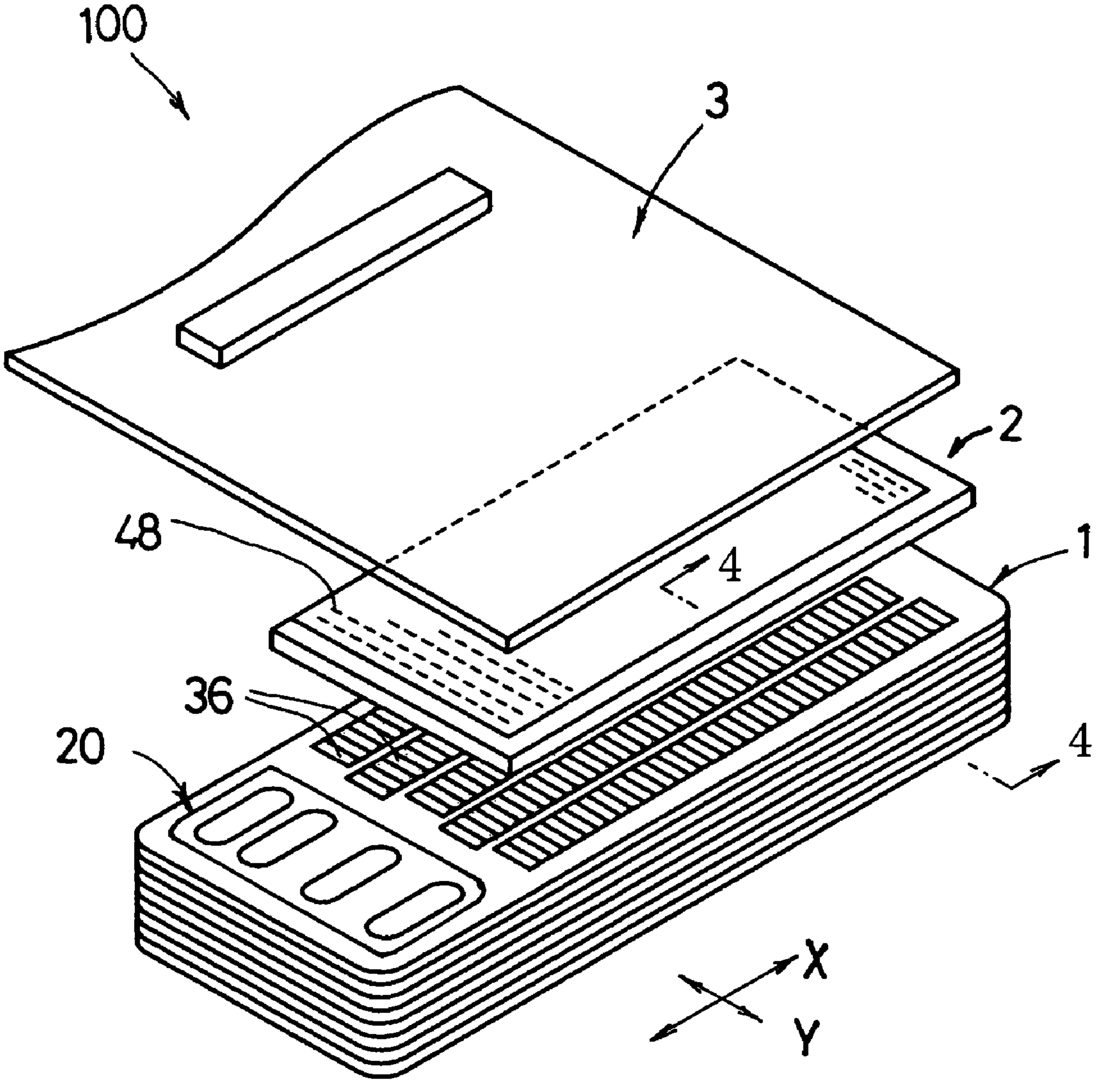
FIG. 1 is an exploded perspective view of an inkjet printhead produced by a method according to one embodiment of the invention.
Figure 4:
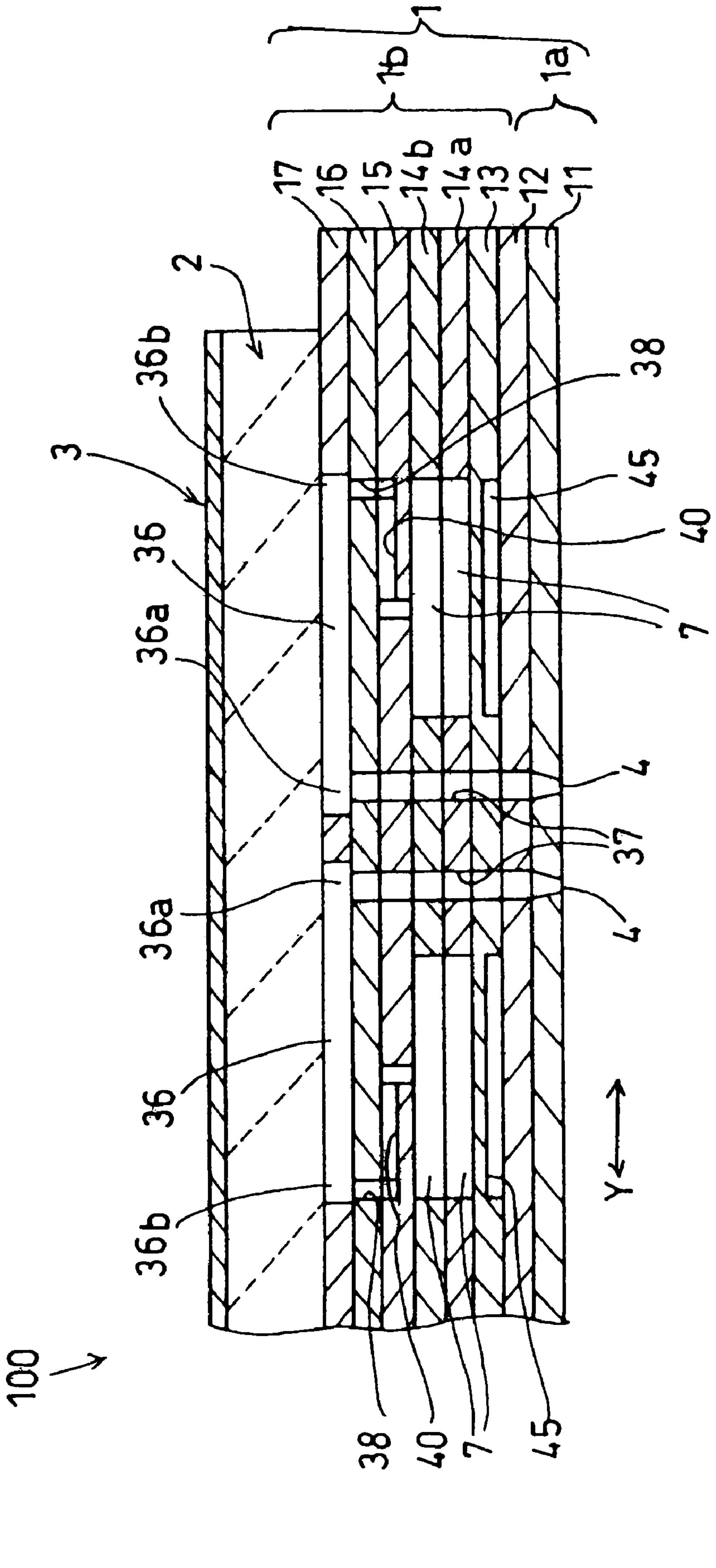
FIG. 4 is an enlarged cross-sectional view taken along line 4-4 in FIG. 1.

In FIG. 1, reference numeral 100 generally denotes a piezoelectric inkjet printhead produced by the method according to the embodiment. The inkjet printhead 100 has a cavity unit 1 including a plurality of plates, a planar piezoelectric actuator 2 fixed on the cavity unit 1, and a flexible flat cable 3 superposed on and fixed to an upper surface of the piezoelectric actuator 2, for connection with an external device. The cavity unit 1 has nozzles 4 open in an under surface of the cavity unit 1 to therefrom eject ink droplets downward, as shown in FIG. 4.

Figure 2:
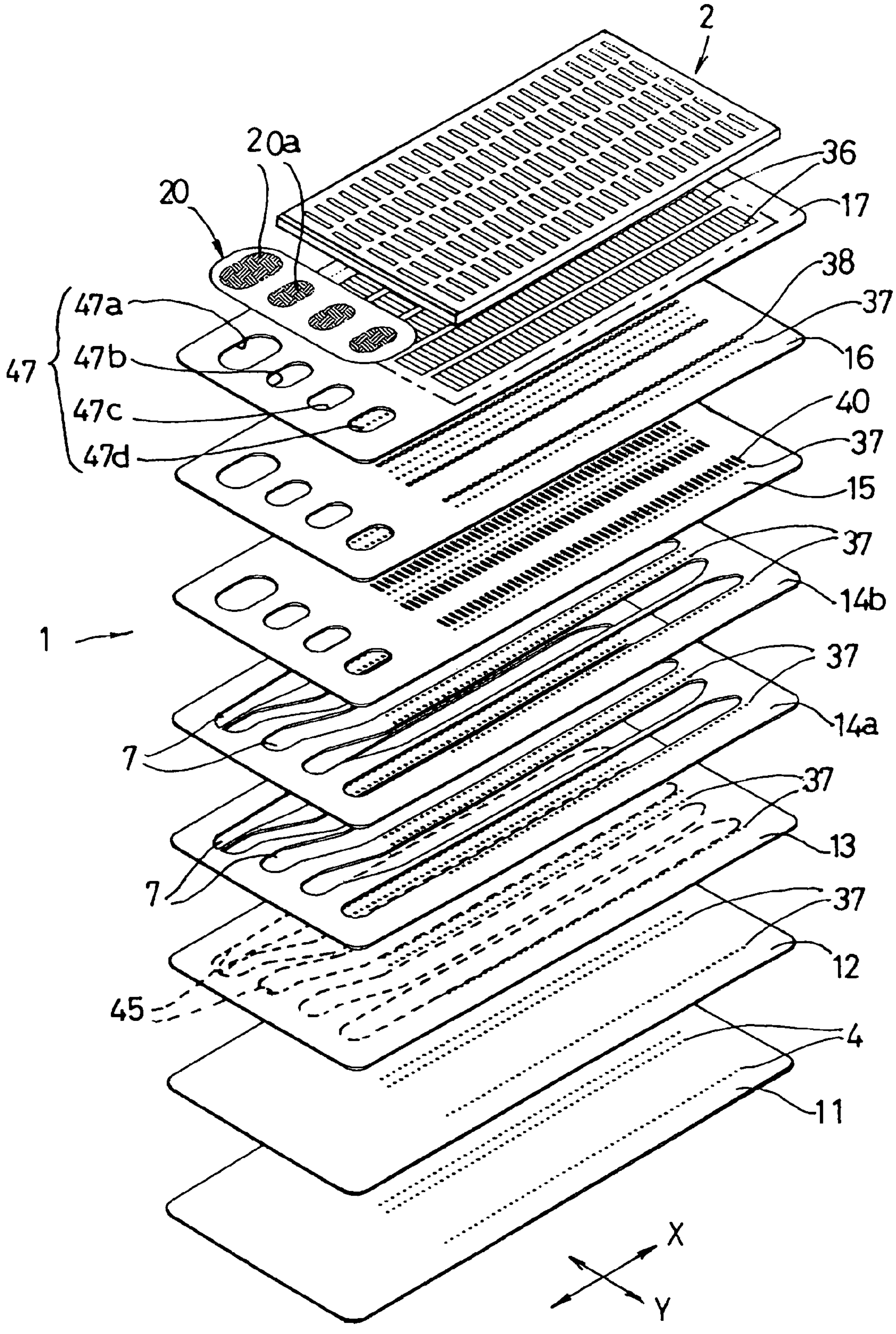
FIG. 2 is an exploded perspective view of a cavity unit of the inkjet printhead.

There will be described a structure of the cavity unit 1. As shown in FIG. 2, the cavity unit 1 is formed by stacking and bonding with an adhesive eight thin plates, namely, a nozzle plate 11, a pacer plate 12, a damper plate 13, two manifold plates 14*a*, 14*b*, a supply plate 15, a base plate 16, and a cavity plate 17.

Each of the plates 11-17 has a thickness of about 50-150 μm. The nozzle plate 11 is made of synthetic resin such as polyimide, and each of the other plates 12-17 is made of a nickel alloy steel sheet containing 42% of nickel. A large number of the nozzles 4 each having a very small diameter, i.e., about 25 μm, are formed through the nozzle plate 11 for ejecting ink droplets therefrom. More specifically, the nozzles 4 are arranged at very small intervals and in five rows in a staggered fashion, with each row extending along a longitudinal direction of the nozzle plate 11, which is parallel to an X-axis direction.

Figure 3:
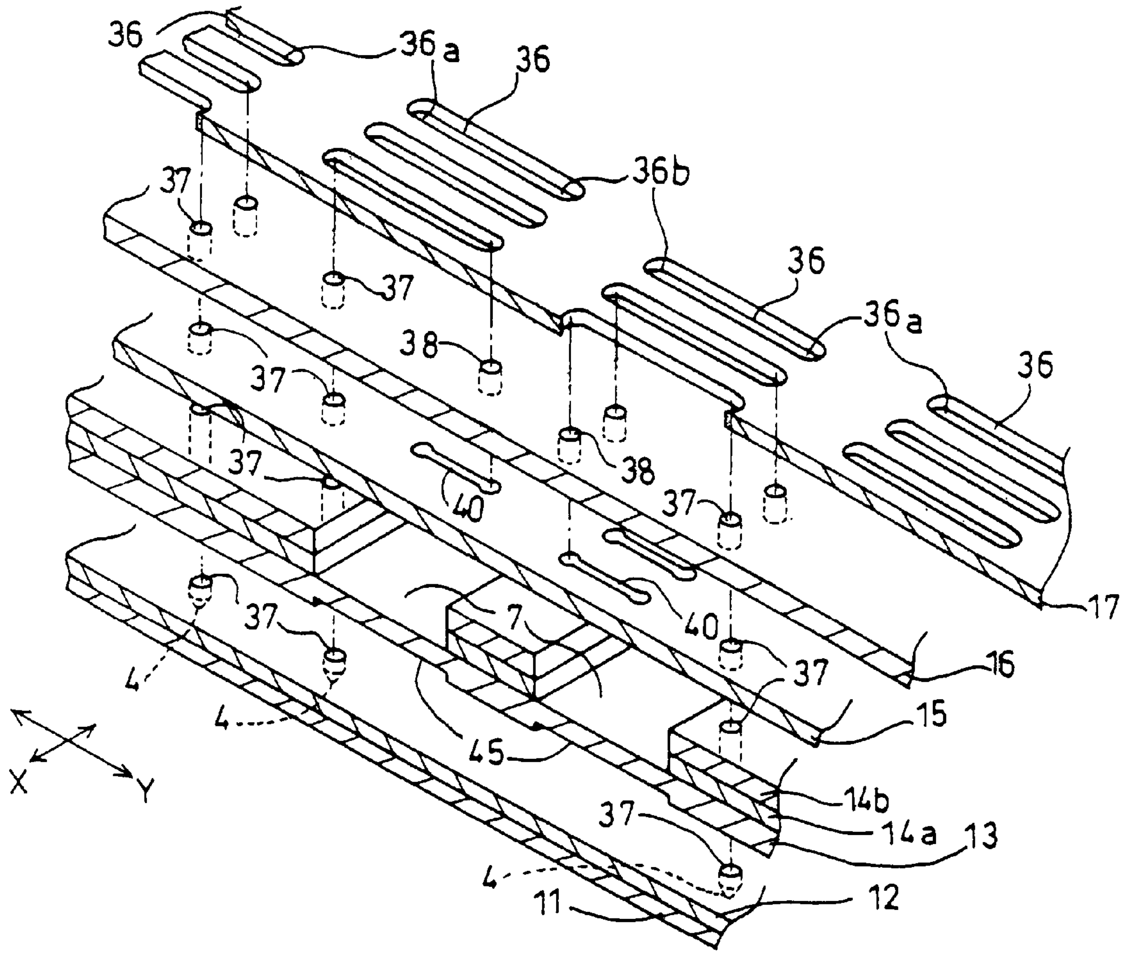
FIG. 3 is a fragmentary exploded perspective view showing a part of the cavity unit in enlargement.

As shown in FIG. 3, the cavity plate 17 has a plurality of pressure chambers 36 formed therethrough. The pressure chambers 36 are arranged in five rows in a staggered fashion, with each row extending along a longitudinal direction of the cavity plate 17, which is parallel to the X-axis direction. Each of the pressure chambers 36 is elongate in plan view, and a longitudinal direction of the pressure chambers 36 is parallel to shorter sides of the cavity plate 17 that extend in a Y-axis direction. One 36*a* of two opposite longitudinal end portions of each pressure chamber 36 is in communication with one of the nozzles 4, while the other longitudinal end portion 36*b* is in communication with a common ink chamber as described later.

The longitudinal end portion 36*a* of each pressure chamber 36 is in communication with one of the nozzles 4 formed in the nozzle plate 11, via one of through-holes 37 of very small diameter formed through the base plate 16, the supply plate 15, the two manifold plates 14*b*, 14*a*, the damper plate 13, and the spacer plate 12, and arranged in rows in a staggered fashion, similarly to the pressure chambers 36.

The base plate 16 immediately under the cavity plate 17 has through-holes 38 formed therethrough. The through-holes 38 are respectively connected with the second longitudinal end portions 36*b* of the pressure chambers 36.

The supply plate 15 immediately under the base plate 16 has connecting passages 40 formed therethrough for supplying ink from common ink chambers 7 (described later), into the pressure chambers 36. Each connecting passage 40 has an inlet through which the ink is introduced from the common ink chamber 7, an outlet open on the side of the pressure chamber 36 or the through-hole 38, and an orifice portion extending between the inlet and the outlet and having a minimum cross-sectional area to have a largest resistance to the ink flow, in the connecting passage 40.

Five common ink chambers 7 are formed through the two manifold plates 14, 14*b*, each to extend in a longitudinal direction of the manifold plates 14*a*, 14*b*, i.e., the X-axis direction. The common ink chambers 7 respectively positionally correspond to the five rows of the nozzle 4. That is, as shown in FIGS. 2 and 4, the two manifold plates 14*a*, 14*b* are stacked and an upper side of the stack of the two manifold plates 14*a*, 14*b* is covered by the supply plate 15 while an under surface thereof is covered by the damper plate 13, so that five closed common ink chambers or manifold chambers 7 are formed. Each of the common ink chambers 7 extends in a direction of extension of each pressure chamber row or each nozzle row, and overlaps a part of each of the pressure chambers 36 of a corresponding row, when seen in a direction of stacking of the plates.

As shown in FIGS. 3 and 4, on an under side of the damper plate 13 immediately under the manifold plate 14*a*, there are formed recesses or damper chambers 45 not in communication with the common ink chambers 7. As shown in FIG. 2, the positions and shapes of the damper chambers 45 coincide with those of the respectively corresponding common ink chambers 7. The damper plate 13 is made of a metallic material elastically deformable, and thus a thin ceiling portion over each damper chamber 45 is capable of vibrating to both of the side of the common ink chamber 7 and the side of the damper chamber 45. Even when a change in pressure in the pressure chamber 36 propagates to the common ink chamber 7 upon ejection of an ink droplet, the ceiling portion elastically deforms and vibrates to give a damping effect to absorb and attenuate the pressure change, thereby preventing a crosstalk that is propagation of the pressure change to another pressure chamber 36.

Through the cavity plate 17, four ink supply ports 47 (individually denoted by reference numerals 47*a*, 47*b*, 47*c*, 47*d* from left to right as seen in FIG. 2) are formed as entrances to the cavity unit 1 for the ink, as shown in FIG. 2. Each of the base plate 16 and the supply plate 15 has openings formed therethrough at positions corresponding to the ink supply ports 47, so that the ink supply ports 47 are connected to longitudinal end portions of the respective common ink chambers 7 via the openings of the base plate 16 and supply plate 15.

To each nozzle 4, an ink passage extends from one of the ink supply ports 47. More specifically, each of inks of respective colors is introduced into the cavity unit from an ink supply source through one of the ink supply ports 47, and then supplied into the common ink chamber 7 as an ink supply channel. Then, the ink is distributed to the pressure chambers 36 via the connecting passages 40 formed in the supply plate 15, and the through-holes 38 formed in the base plate 16, as shown in FIG. 3. By driving the piezoelectric actuator 2, the ink is flowed out from a pressure chamber 36 of interest, into the communication hole 37 to reach the nozzle 4 corresponding to that pressure chamber 36.

As shown in FIG. 2, according to the present embodiment, four ink supply ports 47 are formed while five common ink chambers 7 are formed. That is, the ink supply port 47*a* is connected to two common ink chambers 7, 7, while each of the other ink supply ports 47*b*-47*d* is connected to a single common ink chamber 7. To the ink supply port 47*a*, black ink is supplied, in view of the fact that black ink is more frequently used than the other color inks. To the ink supply ports 47*b*, 47*c*, 47*d*, yellow ink, magenta ink, and cyan ink are respectively supplied. At the ink supply ports 47*a*, 47*b*, 47*c*, 47*d*, a filter member 20 is attached with an adhesive or others. The filter member 20 has four filtering portions 20*a* at respective positions corresponding to the ink supply ports 47*a*-47*d*, as shown in FIG. 2.

The through-holes, recesses, and others formed in the metallic plates 12-17, including the ink supply ports 47, the common ink chambers 37, the communication holes 37, the through-holes 38, the connecting passages 40, the damper chambers 45, are formed by wet etching. However, these through-holes, recesses and others in the plates 12-17 may be formed by electrical discharge machining, plasma machining, laser machining, or by other methods. The filter member 20 is a thin sheet member formed of synthetic resin such as polyimide, and substantially rectangular in plan view. The filtering portions 20*a* of the filter member 20 have through-holes that are formed by laser machining or other methods to have a very small diameter. When a metallic material is used for forming the filter member 20, electroforming may be employed for forming of the filter member 20.

There will be described a structure of the piezoelectric actuator 2. The piezoelectric actuator 2 is constructed similarly to an actuator disclosed in JP-A-4-341853, for instance. That is, the piezoelectric actuator 2 is a laminate of a plurality of piezoelectric sheets, although not shown. Each piezoelectric sheet has a thickness of about 30 μm. On an upper major surface of each even-numbered piezoelectric sheet as counted from the bottom, narrow individual electrodes are formed at positions respectively corresponding to the pressure chambers 36 in the cavity unit 1, and accordingly are arranged in rows each of which extends in the longitudinal direction of the cavity unit 1 or the piezoelectric actuator 2, i.e., the X-axis direction. On an upper major surface of each odd-numbered piezoelectric sheet as counted from the bottom, a common electrode common to a plurality of the pressure chambers 36 are formed. On an upper surface of the topmost one of the sheets, surface electrodes 48 electrically connected to the respective individual electrodes, and a surface electrode electrically connected to the common electrodes are formed.

An adhesive sheet (not shown), which is made of synthetic resin impervious to the inks, is attached to an entire under surface (i.e., the major surface opposed to the pressure chambers 36) of the planar piezoelectric actuator 2. Then, the piezoelectric actuator 2 is bonded and fixed to the cavity unit 1, with the individual electrodes of the piezoelectric actuator 2 aligned with the respectively corresponding pressure chambers 36 in the cavity unit 1. The flexible flat cable 3 is superposed on and pressed onto the upper surface of the piezoelectric actuator 2, as shown in FIG. 4, so that various wiring patterns (not shown) in this flexible flat cable 3 are electrically connected to the surface electrodes 48.

There will be now described how the cavity unit 1 of the inkjet printhead 100 is produced.

The cavity unit 1 includes the eight plates as described above. To produce the cavity unit 1, initially a first laminate 1*a* of two 11, 12 of the eight plates, and a second laminate 1*b* of the other six plates 13-17, are separately prepared, and then the second laminate 1*b* is superposed on and bonded to the first laminate 1*a*. That is, as shown in FIG. 4, a stack 1*a* of the nozzle plate 11 and the spacer plate 12 and another stack 1*b* of the damper plate 13, manifold plates 14*a*, 14*b*, supply plate 15, base plate 16, and cavity plate 17 are initially formed in producing the cavity unit 1.

Figure 5:
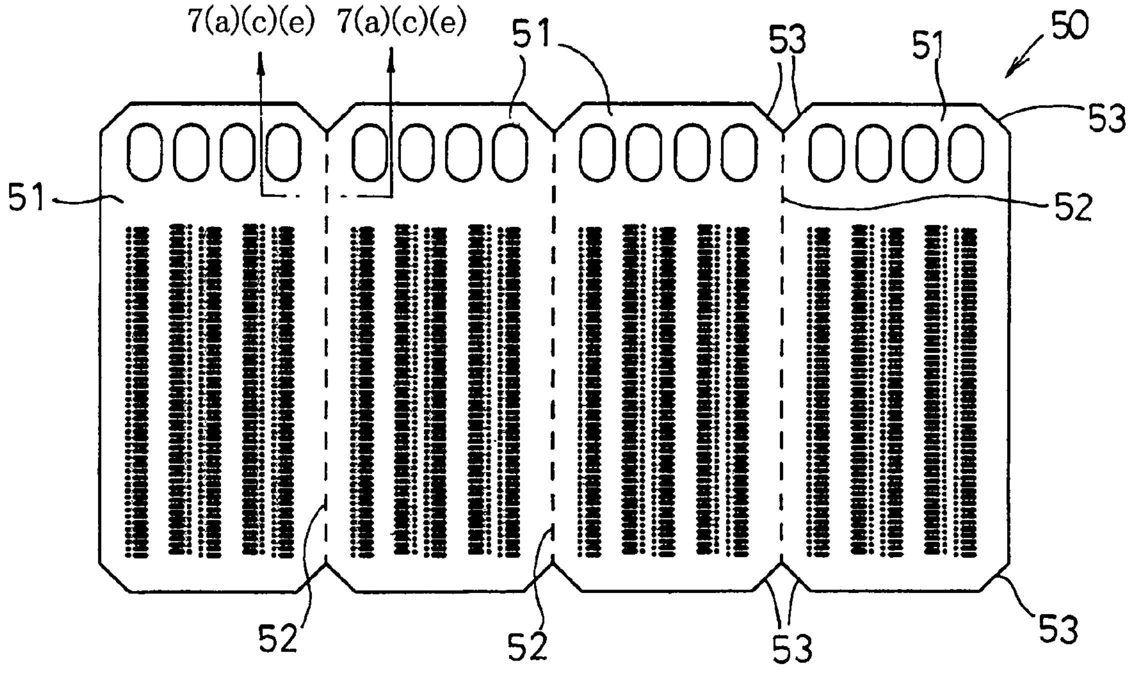
FIG. 5 is a plan view of a material sheet as a component of the cavity unit.
Figure 7A:
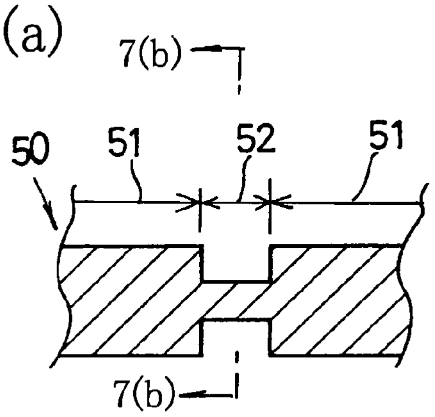
FIG. 7(*a*) is a cross-sectional view taken along line 7(*a*)(*c*)(*e*)-7(*a*)(*c*)(*e*) in FIG. 5, and showing a first example of a weakened portion.
Figure 7B:
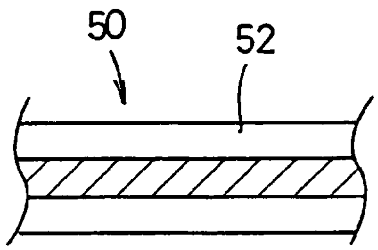
Figure 7C:
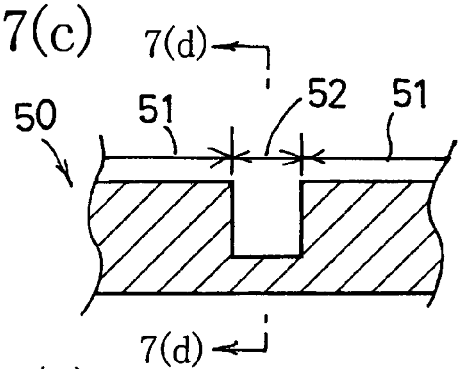
Figure 7D:
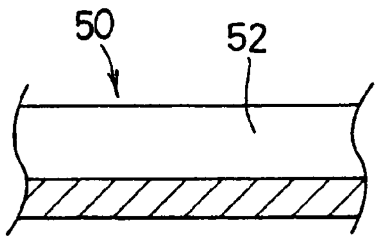
Figure 7E:
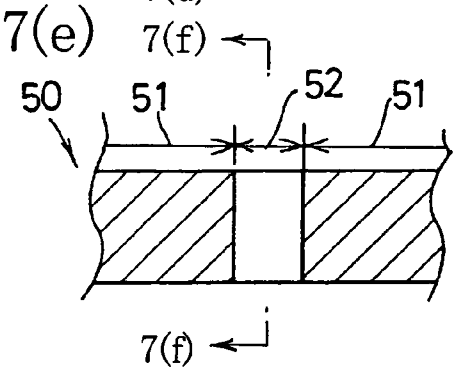
Figure 7F:
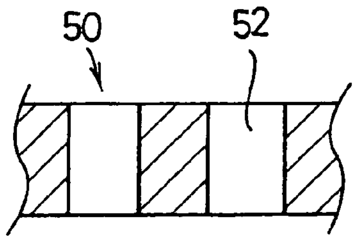

Each of the six plates constituting the second laminate 1*b* is prepared in the form of a large-sized material sheet 50 that has a size or an area at least corresponding to a plurality of plates of a same kind 13-17. That is, where a term "plate region" refers to a region in which an ink-passage pattern, which includes through-holes (and also recesses in the plates 13, 15) for constituting the ink passages and others, for a single plate, is formed, a single material sheet 50 has a plurality of plate regions 51 respectively having ink-passage patterns of a same sort, with a reserved region 52 present between each adjacent two plate regions 51, as shown in FIG. 5. The material sheet 50 is to be cut along the reserved regions 52 into a plurality of individual, discrete laminates, as described later. The plate regions 51 are disposed contiguous to one another to extend all across the material sheet 50. In other words, a side or edge of a plate region 51 which edge is not adjacent to another plate region 51 constitutes a part of the periphery of the material sheet 50, and thus there is left no margin around the plate regions.

Figure 8:
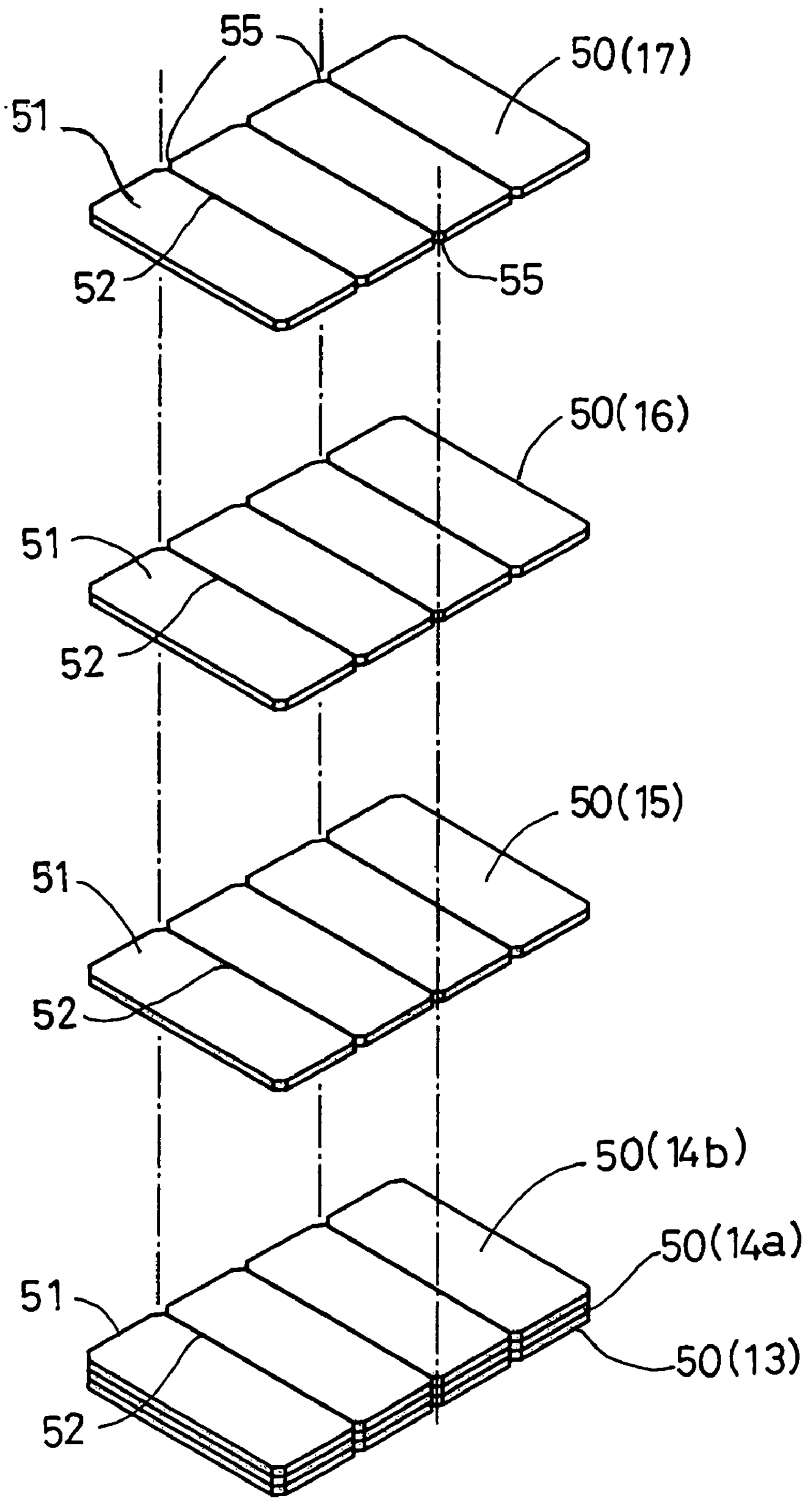
FIG. 8 illustrates how material sheets are stacked.

In FIG. 5 is shown a material sheet 50(15) for the supply plate 15, by way of example. Similarly, there are prepared material sheets 50(13), 50(14*a*), 50(14*b*), 50(16), 50(17) for the other five kinds of plates 13, 14*a*, 14*b*, 16, 17, respectively, as shown in FIG. 8. In plan view, the six kinds of plates 13-17 constituting the second laminate 1*b* have a same, substantially rectangular shape, and accordingly the material sheets 50(13), 50(14*a*), 50(14*b*), 50(15) 50(16), 50(17) for the six kinds of plates 13-17 have a same shape. Each material sheet 50 includes a row of four plate regions 51 with longer sides or edges of the plate regions 51 abutting one another. However, the number and arrangement of the plate regions 51 in a single material sheet 50, and the orientations or arrangements of the ink-passage patterns in the respective plate regions 51 may be otherwise. For instance, four plate regions 51 may be arranged in two rows and in two columns, as shown in FIG. 6(*b*). Further, the orientations or arrangements of the ink-passage patterns may vary in a single material sheet 50, as shown in FIG. 6(*c*).

Each of four corners of each plate region 51 that is substantially rectangular in plan view, is obliquely cut away to form a slant edge 53 there. The corners are cut away concurrently with formation of the ink-passage patterns, so that each cutaway portion or slant edge 53 is disposed at a precise position in a plate region 51 relatively to the ink-passage pattern in the plate region 51. Since each slant edge 53 is formed by cutting a corner away, a dent or a space 55 is formed between two adjacent slant edges 53 on the periphery of the material sheet 50. Where the material sheet 50 is configured as shown in FIG. 6(*b*) or FIG. 6(*c*), four slant edges 53 meet in a major surface of the material sheet 50, thereby forming a space in the form of a through-through-hole 53 open in the major surface. When stacking the material sheets 50(13-17), an outer circumferential surface of a positioning pin 54 is held against adjacent two slant edges 53 of a dent 55 in the arrangement of FIG. 5 and FIG. 6(*a*), or four slant edges 53 of the through-hole 56 in the arrangements of FIG. 6(*b*) and 6(*c*), so as to properly position the material sheets 50(13-17) relatively to one another.

As described above, the material sheet 50 is formed in a rectangular shape in plan view such that the four plate regions 51 are arranged in a row, and three dents 55 are formed along each of two longer sides or edges of the material sheet 50, as shown in FIG. 5. To position the material sheets 50 in a well-balanced manner, positioning pins 54 are respectively set at opposite two of the three dents 55 on one of the longer sides, namely, except the middle one 55, and also at a middle one of the three dents 55 on the other longer edge, as shown in FIG. 6(*a*). The positions and number of the positioning pins 54 are not limited to this, but may be suitably changed. Where each material sheet 50 is configured to have a through-hole 56 at a central portion thereof as shown in FIGS. 6(*b*) and 6(*c*), a positioning pin 54 is disposed at one of the dents 55 on the periphery of the material sheet 50 and at the through-hole 56, in order to position the material sheets 50 in a well-balanced manner.

The reserved region 52 between each adjacent two plate regions 51 extends along the longer sides or edges of the plate regions in a length substantially the same as the longer sides or edges of the plate regions. At the reserved region 52, a groove is formed on each of opposite surfaces of the material sheet 50, as shown in FIGS. 7(*a*) and 7(*b*), so as to reduce a thickness of the material sheet 50 at the reserved region 52, thereby providing a weakened portion where a mechanical strength of the material sheet 50 is lowered for facilitating cutting or segmentation of the material sheet 50 into the individual laminates 1*b* of plates. The ink-passage patterns in the respective plate regions 51 are formed by wet etching, and the weakened portions are formed concurrently with the formation of the ink-passage patterns by the wet etching, thereby omitting a special step for forming only the weakened portions. Thus, the manufacturing cost is not increased by the formation of the weakened portions.

The weakened portions may be otherwise formed. For instance, as shown in FIGS. 7(*c*) and 7(*d*), a groove may be formed on only one of the opposite surfaces of the material sheet 50. Alternatively, as shown in FIGS. 7(*e*) and 7(*f*), a plurality of through-holes may be formed intermittently through the thickness of the material sheet 50, so as to form a line in and along each reserved region 52. However, where a dicer is used for the singulation of the sheet material 50, namely, cut the sheet material 50 along the reserved regions 52 into the individual laminates 1*b* of plates, the weakened portions need not be formed, but merely a width of the reserved region 52 needs to be suitably determined correspondingly to a width of a blade of the dicer to be used.

Once material sheets 50(13-17) each having the structure as described above have been prepared for all of the six kinds of plates 13-17 constituting the second laminate 1*b*, the six material sheets 50(13-17) are stacked using a jig (not shown), in the proper order and with an adhesive interposed in each adjacent two material sheets 50(13-17), as shown in FIG. 8. The two or three positioning pins 54 are set on the jig so as to be fitted on the respectively corresponding dents 55, as shown in one of FIGS. 6(*a*)-6(*c*), such that the material sheets 50(13-17) do not rattle around the dents 55. The six material sheets 50 are sequentially stacked along the positioning pins 54 serving as a guide, so that the four plate regions 51 of each material sheet 50 is properly positioned relatively to the respectively corresponding plate regions 51 of the other material sheets 50 disposed over and/or under the material sheet 50. That is, six plate regions 51 in the respective six material plates 51 and at a same horizontal position are aligned with high precision. In this way, a laminate where the six material sheets 50(13-17) are stacked and bonded with the adhesive is obtained.

The spacer plate 12 is formed similarly to the other metallic plates 13-17. Namely, a large-sized material sheet 50 integrally having a plurality of spacer-plate regions corresponding to a plurality of spacer-plates 12, is first prepared. Then, individual nozzle-plate materials are bonded to the respective spacer-plate regions. When the nozzle-plate material is bonded to the spacer-plate region, the nozzles 4 are not yet formed in the nozzle-plate material. The nozzle-plate material is bonded to the spacer-plate region at a place where the communication holes 37 are formed. Thus bonded to the space-plate region, the nozzle-plate material is irradiated with a laser beam through the communication holes 37 so as to form the nozzles 4 at positions corresponding to the communication holes 37.

Thus, there is obtained an assembly of the material sheet 50 including a plurality of spacer-plate regions, and the nozzle-plate materials bonded to the respective spacer-plate regions. This assembly is bonded to the laminate of the six material sheets 50(13-17), using a jig, with the spacer-plate regions of the assembly and the plate regions of the laminate properly positioned relatively to each other, in the same way as described above with respect to the stacking and bonding of the six material sheets 50 of the six kinds of plates 13-17 constituting the second laminate 1*b*.

This method where the laminate of the six material sheets 50(13-17) is initially prepared may be modified as follows. That is, a laminate of the seven material sheets of respective kinds of plates 12-17 is formed at once, and then the nozzle-plate materials are bonded to this laminate.

Thus, a final assembly where the assembly of the material sheet 50 of the spacer plates 12 and the nozzle-plate materials is bonded to the laminate of the six material sheets 50 is obtained. This final assembly is taken off of the jig, and cut along the reserved regions 52 into four individual cavity units 1. With the weakened portions formed at the reserved regions 52, the singulation of the final assembly is easily made by merely bending the final assembly with a small force.

As described above, the material sheet 50 according to the invention is configured such that the contiguous plate regions 51 extend all across the material sheet 50 without leaving a margin at the periphery of the material sheet 50, and thus a frame F (shown in FIG. 9) as seen in a material sheet according to the conventional method is not present. Accordingly, when the individual cavity units 1 are obtained by cutting the final assembly of the material sheets 50 and nozzle-plate materials, a nonuse part or waste material such as a frame is not produced, omitting the trouble of discarding the waste material which the conventional method suffers. In addition, to include a same number of plate regions 51 in a single material sheet 50, planar dimensions of the material sheet 50 according to the invention is smaller than that of the material sheet according to the conventional method. In other words, when a material sheet 50 that has the same planar dimensions as the conventional material sheet is to be used, the number of the plate regions 51 obtainable from the single material sheet 50 can be increased by an amount corresponding to the frame that would be otherwise present in the conventional method. This may be achieved as follows. That is, when wet etching is performed on a precursor of the material sheet 50 to form the ink-passage pattern therein and to thus obtain the material sheet 50, an etching mask of the same size as an etching mask used in the conventional method is formed on the precursor in such a pattern as to produce a larger number of plate regions than in the conventional method. Thus, the components cost is reduced.

According to the present embodiment, the cutaway portions or the slant edges 53 formed in the plate regions 51 are utilized in setting the positioning pins 54 upon stacking of the material sheets 50. Hence, even without the conventionally seen frame in which holes for positioning the material sheets are formed, the material sheets 50 can be properly positioned. That is, it is not necessary to leave in a material sheet an area for forming holes or others for positioning of the material sheet, thereby enabling to effectively utilizing the material sheet.

Figure 9:
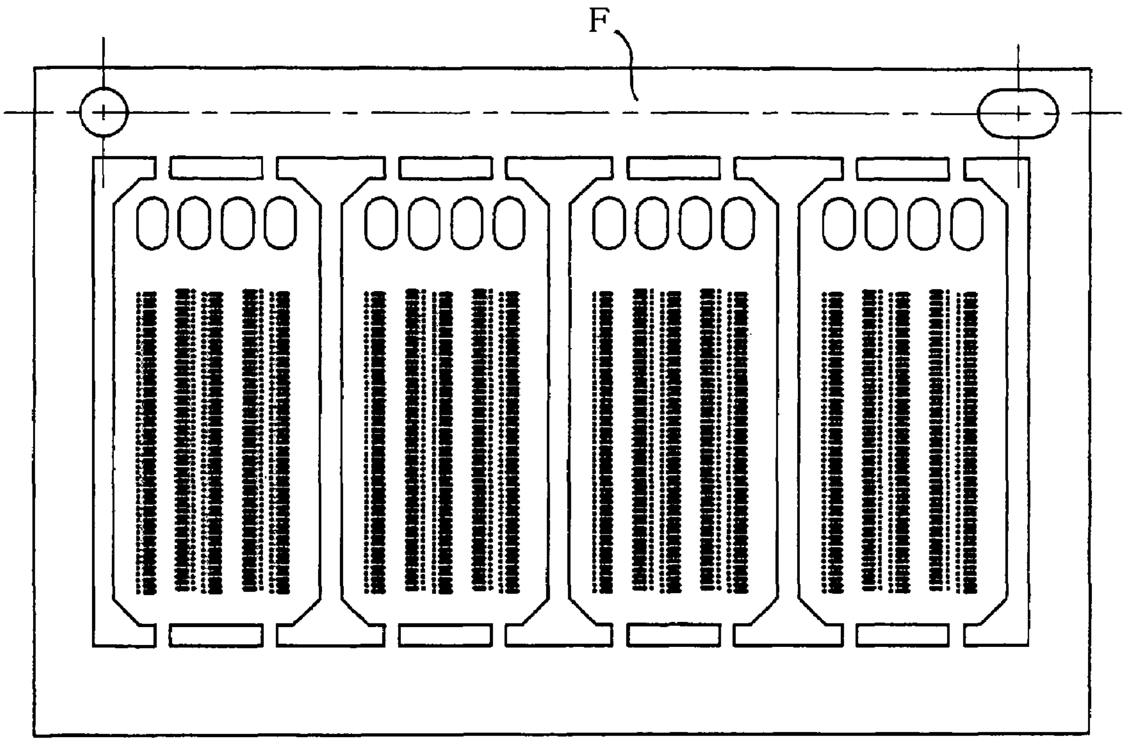
FIG. 9 is a plan view of a material sheet used in a conventional method of producing a cavity unit.

In the material sheet of the conventional method as shown in FIG. 9, the plate regions are connected to the frame with narrow bridges. In a case where the plate regions are excessively long, the plate regions deform or sag. In contrast, according to this embodiment, the reserved region 52 where the weakened portion is formed is present between each two adjacent longer sides of the plate regions 51, thereby preventing the plate regions 51 from sagging. Thus, there are prevented deterioration in easiness in handling of the material sheet 50 and permanent deflection of the plate regions 51.

The present invention is not limited to the details of the above-described embodiment, but may be otherwise embodied with various modifications and improvements which may occur to those skilled in the art, without departing from the scope and spirit of the present invention. For instance, although in the above-described embodiment the invention is applied to lamination of the material sheets 50 for the plates 13-17 constituting the second laminate 1*b* of the cavity unit 1, the structure of a laminate produced by the method of the present invention and the number of plates constituting the laminate are not limited to those in the embodiment, but may be changed as desired.

What is claimed is:

1. A method of producing an inkjet printhead including a cavity unit having therein ink passages and formed by stacking a plurality of kinds of flat plates each of which has a specific ink-passage pattern for constituting the ink passages, the method comprising:

preparing a large-sized material sheet for each kind of a plate, such that the material sheet comprises a plurality of plate regions, each of which corresponds to one individual plate of the kind, and which are contiguous to one another such that a reserved region for cutting is between each adjacent two plate regions and there is left no margin at a periphery of the material sheet;

obtaining a laminate of the material sheets by stacking the material sheets of respective kinds of plates, with the corresponding plates in the respective material sheets aligned in a direction of stacking of the material sheets; and obtaining a plurality of individual laminates by cutting the laminate of the material sheets at the at least one reserved region into the individual laminates;

wherein the preparing the material sheet comprises forming in the material sheet at least two cutouts at respective positions at least one of which is on the periphery of the material sheet; and wherein the obtaining the laminate of the material sheets comprises placing a positioning pin that extends along a direction of the stacking of the material sheets at a space formed inside each of the at least two cutouts.

2. The method according to claim 1;

wherein forming the at least two cutouts at respective positions comprises forming at least one of the at least two cutouts at a longitudinal end of the at least one reserved region.

3. The method according to claim 2;

wherein the preparing the material sheet comprises forming each of the plate regions in a quadrilateral shape, and wherein the forming the at least two cutouts comprises cutting away at least two corners of any one or more of the quadrilateral plate regions, the at least two corners being remote from one another.

4. The method according to claim 3;

wherein the forming the at least two cutouts comprises cuffing away corners of the plate regions, each of which corners is located at a longitudinal end of the at least one reserved region, so that each of the at least two cutouts is formed in a V-shape by adjacent two of the cutaways.

5. The method according to claim 3;

wherein the preparing the material sheet comprises forming each of the plate regions and the material sheet in a rectangular shape.

6. The method according to claim 1;

wherein the forming at least two cutouts comprises forming a pair of cutouts on one edge of the material sheet.

7. The method according to claim 6;

wherein the forming at least two cutouts comprises forming another cutout on another edge of the material sheet which is opposite to the edge on which the pair of cutouts are formed, at an intermediate position between the pair of cutouts.

8. A method of producing an inkjet printhead including a cavity unit having therein ink passages and formed by stacking a plurality of kinds of flat plates each of which has a specific ink-passage pattern for constituting the ink passages, the method comprising:

preparing a large-sized material sheet for each kind of a plate, such that the material sheet comprises a plurality of plate regions, each of which corresponds to one individual plate of the kind, and which are contiguous to one another such that a reserved region for cutting is between each adjacent two plate regions and there is left no margin at a periphery of the material sheet;

obtaining a laminate of the material sheets by stacking the material sheets of respective kinds of plates, with the corresponding plates in the respective material sheets aligned in a direction of stacking of the material sheets; and obtaining a plurality of individual laminates by cutting the laminate of the material sheets at the at least one reserved region into the individual laminates;

wherein the preparing the material sheet comprises forming the material sheet such that:

each of the plate regions has a rectangular shape;

the plate regions are arranged in at least two rows and two columns;

the at least one reserved region comprises at least two reserved regions, each of a part of which is a first reserved region extending between each two adjacent rows, and each of the other part of which is a second reserved region extending between each two plate regions adjacent in one of the rows, so that the first reserved region and the second reserved region are perpendicular to each other to form at least one intersecting point therebetween;

at least two cutouts are formed in the material sheet; and at least one of the at least two cutouts is a through-hole formed at the at least one intersecting pint.

9. The method according to claim 8;

wherein the preparing the material sheet comprises forming the at least two cutouts to include the at least one cutout formed on the periphery of the material sheet, as well as the through-hole.

10. A method of producing an inkjet printhead including a cavity unit having therein ink passages and formed by stacking a plurality of kinds of flat plates each of which has a specific ink-passage pattern for constituting the ink passages, the method comprising:

preparing a large-sized material sheet for each kind of a plate, such that the material sheet comprises a plurality of plate regions, each of which corresponds to one individual plate of the kind, and which are contiguous to one another such that a reserved region for cutting is between each adjacent two plate regions and there is left no margin at a periphery of the material sheet;

obtaining a laminate of the material sheets by stacking the material sheets of respective kinds of plates, with the corresponding plates in the respective material sheets aligned in a direction of stacking of the material sheets; and obtaining a plurality of individual laminates by cutting the laminate of the material sheets at the at least one reserved region into the individual laminates;

wherein the preparing the material sheet comprises forming the material sheet with metal and forming the ink-passage pattern by etching; and wherein the reserved region is formed by the etching in the form of a weakened portion, concurrently with the formation of the ink-passage pattern.

11. The method according to claim 10;

wherein the weakened portion is formed by etching the material sheet from both of opposite sides thereof.

12. The method according to claim 10;

wherein the weakened portion is formed by etching the material sheet from one of opposite sides thereof.

13. The method according to claim 10;

wherein the weakened portion is formed by etching the material sheet so that a plurality of through-holes are formed in a line.

* * * * *